(12) United States Patent
Li et al.

(10) Patent No.: US 7,527,861 B2
(45) Date of Patent: May 5, 2009

(54) JOBSITE-RENEWABLE MULTILAYER FLOOR FINISH WITH ENHANCED HARDENING RATE

(75) Inventors: Minyu Li, Oakdale, MN (US); Robert D. P. Hei, Baldwin, WI (US); Mark D. Levitt, Saint Paul, MN (US); Lauren K. Carlson, Saint Paul, MN (US)

(73) Assignee: Ecolab, Inc., St. Paul, MN (US)

( * ) Notice: Subject to any disclaimer, the term of this patent is extended or adjusted under 35 U.S.C. 154(b) by 697 days.

(21) Appl. No.: 10/756,119

(22) Filed: Jan. 12, 2004

(65) Prior Publication Data

US 2005/0153140 A1 Jul. 14, 2005

(51) Int. Cl.
*B32B 9/04* (2006.01)
*B35D 1/38* (2006.01)

(52) U.S. Cl. .............. 428/411.1; 428/423.1; 427/372.2; 427/393.5; 427/407.1

(58) Field of Classification Search .............. 428/423.1, 428/411.1; 427/372.2, 385.5, 393.5, 407.1
See application file for complete search history.

(56) References Cited

U.S. PATENT DOCUMENTS

| | | | |
|---|---|---|---|
| 4,278,578 A * | 7/1981 | Carpenter .................... 524/77 |
| 4,517,330 A | 5/1985 | Zdanowski et al. |
| 4,763,133 A | 8/1988 | Takemura et al. |
| 4,891,248 A | 1/1990 | Kraus |
| 4,917,955 A | 4/1990 | Porter, Jr. et al. |
| 5,089,645 A * | 2/1992 | Nichols et al. ................ 556/90 |
| 5,225,248 A | 7/1993 | Stephenson |
| 5,315,734 A | 5/1994 | Kresse et al. |
| 5,319,018 A | 6/1994 | Owens et al. |
| 5,390,390 A | 2/1995 | Kresse et al. |
| 5,468,532 A * | 11/1995 | Ho et al. .................... 428/40.9 |
| 5,494,705 A | 2/1996 | Yamasoe et al. |
| 5,531,820 A | 7/1996 | Gorecki |
| 5,573,812 A | 11/1996 | Moy |
| 5,578,345 A | 11/1996 | Moy |
| 5,580,610 A | 12/1996 | Moy |
| 5,608,000 A | 3/1997 | Duan et al. |
| 5,610,232 A | 3/1997 | Duan et al. |
| 5,680,667 A | 10/1997 | Kresse et al. |
| 5,851,618 A | 12/1998 | Liddell et al. |
| 5,887,311 A | 3/1999 | Kresse et al. |
| 5,965,686 A | 10/1999 | Blank et al. |
| 5,998,035 A | 12/1999 | Iwamura et al. |
| 6,113,989 A | 9/2000 | Sinko |
| 6,316,535 B1 | 11/2001 | Caldwell et al. |
| 6,335,304 B1 | 1/2002 | He et al. |
| 6,353,057 B1 | 3/2002 | He et al. |
| 6,419,731 B2 | 7/2002 | Inbe et al. |
| 6,544,942 B1 | 4/2003 | Smith et al. |
| 6,583,101 B1 | 6/2003 | Wiseth et al. |
| 6,627,725 B2 | 9/2003 | Ardaud et al. |
| 2002/0028621 A1 | 3/2002 | Levitt et al. |
| 2002/0103278 A1 | 8/2002 | Krajnik et al. |
| 2003/0064256 A1 | 4/2003 | Sadvary et al. |
| 2004/0159555 A1 * | 8/2004 | Purdy et al. .................. 205/198 |

FOREIGN PATENT DOCUMENTS

| | | |
|---|---|---|
| EP | 509437 A2 | 1/1999 |
| EP | 1433 827 A1 | 6/2004 |
| GB | 2216039 | 4/1989 |
| JP | 06-025593 | 2/1994 |
| WO | WO 96/40811 A1 | 12/1996 |
| WO | WO 98/11168 | 3/1998 |
| WO | WO 98/29489 A1 | 7/1998 |

OTHER PUBLICATIONS

Florio, *Troubleshooting Metal Catalyzed Urethane Systems*, Paint & Coatings Industry (Sep. 26, 2000), available on the internet at http://www.pcimag.com/CDA/ArticleInformation/features/BNP_Features_Item/0,1846,11371,00.html.

Stamenković et al., *Catalysis of the Isocyanate-Hydroxyl Reaction by Non-Tin Catalysts in Water Borne Two Component Polyurethane Coatings*, Facta Universitatis Series: Working and Living Environmental Protection, vol. 2, No. 4, pp. 243-250 (2004), available on the internet at http://facta.junis.ni.ac.yu/facta/walep/walep2004/walep2004-02.pdf.

*Sulfated and tungstated zirconium-solid, strong acid catalysts*, MELCat Doc 2000, (MEL Chemicals/MEI/Nikkei-MEL), available on the Internet at http://www.zrchem.com/literature/literature/PDF%27s/MEL2000.pdf.

No. AD200C1 polyester polyurethane formulation, Air Products and Chemicals, Inc. (Apr. 2001).

STAY-CLAD™ 5900 Technical Bulletin, Reichold, Inc. (Oct. 2001).

No. G-2029 acrylic polyurethane formulation, Zeneca Resins (dated "Jan. 3, 2000").

*Markets and Products, I & I Floorcare, Mixed-Metals Crosslinked Floor Care Polymers*, pp. 1-2, retrieved online Sep. 11, 2003 from the Internet:<URL: http://www.rohmhass.com/rhcis/markets_and_products/FloorCarePolymersMixedMetal.htm.

(Continued)

*Primary Examiner*—Thao T. Tran
(74) *Attorney, Agent, or Firm*—IPLM Group, P.A.

(57) ABSTRACT

A jobsite-renewable multilayer floor finish system has an undercoat employing a first hardening system, an autohard-enable (e.g., two-part) topcoat employing a second hardening system, and at least one initiator for the topcoat hardening system in at least the undercoat. The initiator increases the topcoat hardening rate while reducing the topcoat pot life to a lesser extent than would be the case if the initiator were included only in the topcoat. The increased topcoat hardening rate facilitates earlier application of additional topcoat layers, or earlier return of the floor to service.

53 Claims, 1 Drawing Sheet

OTHER PUBLICATIONS

*Aqueous Two-Component Polyurethane (2K-PUR) Coatings:An Evolving Technology*, Martin Melchiors et al., pp. 1-10, retrieved online Sep. 11, 2003 from the Internet:<URL: http://www.coatings.de/articles/ecspapers/melchiors/melchiors.htm.

*Anti-static coating solution for flat panel dispiay (display)*, Product Development Room, Advanced Materials Business Division, pp. 45-46, Technical Report 1999.

*Applications* retrieved online from the Nanophase Technologies Corporation Home Page on Dec. 11, 2003, from the Internet:<URL: http://www.nanophase.com/.

*ATO anti-static coating inks and coating film*, Display Materials Group, Advanced Materials Business Division, Shinichi Tanaka et al., pp. 32-34, Technical Report 2000.

*Floor Finish Products* page retrieved from the Jan. 8, 2003 Internet Archives entries stored at Internet:<URL: http://web.archive.org/web/20030118031312/http://www.chemcor.net/floor_finish.htm, pp. 1-3.

*Ultraviolet Hardening Type Antistatic Hard Coat Paint for Plastic*, Technical Documents, Advanced Materials Division, Sumitomo Osaka Cement Co., Ltd., retrieved online from the Sumitomo Osaka Cement Co., Ltd., Home Page on Dec. 11, 2003 from the Internet:<URL:http://www.socnb.com.

*Ultrafine Zinc Oxide (ZnO)*, Advanced Materials Division Sales Group, Sumitomo Osaka Cement Co., Ltd. (possibly dated "Jan. 2003").

Owens, Joseph M., *It's What's on the Inside that Counts—The Chemistry of Floor Polishes*, Technology of Floor Maintenance and Current Trends, pp. 3-28 (2004).

Braun, Juergen H., *Federation Series on Coatings Technology: White Pigments*, Federation of Societies for Coatings Technology, 44 pgs. (Jun. 1995).

\* cited by examiner

JOBSITE-RENEWABLE MULTILAYER FLOOR FINISH WITH ENHANCED HARDENING RATE

TECHNICAL FIELD

This invention relates to methods for applying jobsite-renewable floor finishes and to floors coated with such finishes.

BACKGROUND

Jobsite-renewable floor finish systems can be used to provide a high gloss, wet look finish on installed flooring materials such as wood flooring, linoleum, stone flooring, ceramic, Terrazzo, concrete, rubber tiles and sheeting, cork, and vinyl tiles and sheeting. The finish may be applied by coating the floor with successive thin coats. In some floor finish systems the finish employs a first layer or layers of an undercoat and with a further layer or layers of a wear-resistant topcoat. For example, U.S. Patent Application Publication No. US 2002/0028621A1 describes a multilayer floor finish system having a readily strippable intermediate layer under a less strippable UV cured topcoat. Published PCT Application No. WO 98/11168 describes a radiation curable floor finish system that can optionally be applied atop a latex primer. U.S. Pat. No. 5,851,618 describes a peelable floor finish system having a release coating overlaid by a more durable coating. Once such finishes have become worn, soiled, lost gloss or are otherwise in need of replacement, the entire multilayer finish usually is removed and reapplied. Desirably this is carried out without subjecting the floor to potentially damaging removal methods such as sanding.

Other multilayer coatings include JFB Hart Coatings, Inc.'s HP Products line of polyurethane and epoxy primers and coatings, and Minuteman International, Inc.'s FIRST ROUND™ undercoat, FINAL FLOOR™ topcoat and aziridine crosslinker/catalyst.

Although not involving floors, various multilayer vehicular priming and paint systems are described in U.S. Pat. Nos. 4,917,955, 5,225,248, 5,573,812, 5,578,345 and 5,580,610. Unlike floors, it generally is not necessary to walk on the primed vehicle surface between coats.

SUMMARY OF THE INVENTION

Curable multi-part coating compositions that will cure soon after the various parts are mixed can potentially be used as wear-resistant floor finish topcoats. Topcoats that cure in such fashion could be referred to as "autohardenable" compositions, that is, compositions that begin hardening as soon as they are mixed or dispensed and without requiring measures such as UV energy, heat or other external factors to initiate hardening. If properly formulated, an autohardenable topcoat may exhibit high crosslink density, good wear resistance and good durability. It can be difficult however to attain these features while still obtaining a finish that will be removable using methods (e.g., chemical strippers or peeling away the finish) that do not substantially damage the floor. Often a compromise among factors such as the topcoat pot life, topcoat hardening rate, topcoat gloss level, finish wear resistance and strippability will be required. For example, a topcoat formulation that is suitable in most other respects may exhibit an unacceptably slow hardening rate or an unacceptably long tack-free time before additional coats can be applied or before the floor can be returned to service. Catalysts can be added to the topcoat to increase its hardening rate and reduce its tack-free time, but this may significantly reduce pot life and can make the finish difficult to apply, especially to large floors.

We have found that by employing a jobsite-renewable multilayer floor coating system having an undercoat employing a first hardening system, an autohardenable topcoat employing a second hardening system, and at least one initiator for the topcoat hardening system in at least the undercoat, we can enhance the topcoat hardening rate without unduly lessening the topcoat pot life. Accordingly, the present invention provides, in one aspect, a method for applying a jobsite-renewable finish to a floor comprising applying to the floor a multilayer coating system comprising an undercoat employing a first hardening system and an autohardenable topcoat employing a second hardening system, wherein at least the undercoat comprises at least one initiator for the topcoat hardening system in an amount sufficient to decrease the topcoat tack-free time.

The present invention provides, in another aspect, a coated floor comprising a flooring substrate and a jobsite-renewable finish comprising a hardened undercoat employing a first hardening system atop the floor and an autohardened topcoat employing a second hardening system atop the undercoat, wherein at least the unhardened undercoat comprises at least one initiator for the topcoat hardening system in an amount sufficient to decrease the topcoat tack-free time.

The invention also provides a jobsite-renewable floor finish kit comprising (a) an undercoat employing a first hardening system, (b) an autohardenable topcoat employing a second hardening system and (c) instructions for jobsite application of the undercoat to a floor and the topcoat to the undercoat, wherein at least the undercoat comprises at least one initiator for the topcoat hardening system in an amount sufficient to decrease the topcoat tack-free time.

DETAILED DESCRIPTION

By using words of orientation such as "atop", "beneath", "on", "under", "uppermost", "lowermost", "between" and the like for the location of various layers in the disclosed multilayer coating system, we refer to the relative position of one or more layers with respect one another or where the context requires with respect to an underlying flooring substrate. We do not intend that the layers or flooring substrate must be horizontal, do not intend that the layers and flooring substrate must be contiguous or continuous, and do not exclude the presence of one or more intervening layers between layers or between the flooring substrate and a layer.

As used in connection with this disclosure, a "multilayer coating system" is a coating system that employs an undercoat and a topcoat of different compositions. In the interest of brevity, a layer or plurality of layers of the undercoat composition located between the flooring substrate and a topcoat may be referred to collectively as an "undercoat", a layer or plurality of layers of the topcoat composition located atop the flooring substrate and undercoat may be referred to collectively as the "topcoat", and a combination of a cured undercoat and topcoat (or a topcoat alone) located atop a flooring substrate may be referred to as "coating" or "finish".

As used in connection with this disclosure, a "film-former" is a monomer, oligomer or polymer that can be applied (if need be, with a suitable plasticizer or coalescing solvent) and dried, crosslinked or otherwise hardened to form a tack-free substantially durable film.

As used in connection with this disclosure, a "hardening system" is a chemical or physical process (including solvent evaporation or other drying processes, photochemical reactions, electrochemical reactions, radical processes, ionic processes, moisture cure processes and multiple-component (e.g., two or three component) crosslinking processes) through which an undercoat or topcoat composition becomes dried, crosslinked or otherwise cured to form a tack-free substantially durable film.

As used in connection with this disclosure, an "initiator" is an agent that can cause topcoat hardening or accelerate the rate at which topcoat hardening occurs. We include among initiators materials such as catalysts (including energy activated catalysts, photocatalysts or photoinitiators and thermal catalysts), Lewis and Brönsted acids and bases, radical sources, metal compounds, organometallic compounds and the like.

As used in connection with this disclosure, an "autohardenable" or "autohardened" topcoat is a topcoat that begins hardening upon being mixed or dispensed and without requiring an external energy source such as UV or visible light illumination or elevated heating to harden to at least a tack-free state when in a thin film form. We include among autohardenable topcoats those having multi-part (e.g., two-part) formulations with two or more separately packaged components that will harden shortly after the components are mixed and applied to a flooring substrate. We also include among autohardenable topcoats those in which the components are packaged in a single container with one or more septa or other suitable dividers that can prevent the components from mixing until desired by a user. We also include among autohardenable topcoats those containing an encapsulated ingredient that will cause hardening of the topcoat when the topcoat is mixed, dispensed or otherwise processed in a way that causes the microcapsules to rupture.

As used in connection with this disclosure, "pot life" is the time period after an autohardenable topcoat is dispensed from its container (and if need be, its components mixed, dispensed or otherwise processed to initiate hardening) during which the topcoat can successfully be applied to a flooring substrate to form a thin, visibly smooth, self-leveling, cured film whose properties are generally similar to those exhibited by the topcoat if applied immediately after being dispensed.

As used in connection with this disclosure, a topcoat is regarded as being "stripper-permeable" if when coated atop a desired undercoat and subjected to the action of a suitable chemical stripper, the stripper permeates or otherwise penetrates the topcoat sufficiently so that the both the topcoat and undercoat can be removed from the floor. Stripper permeability can sometimes be enhanced by mechanically roughening, puncturing or abrading the topcoat (using, for example, a nonwoven floor scrub pad, brush or other mild abrasive measure) just prior to stripping. A topcoat will be regarded as being stripper-permeable even if such mechanical roughening is necessary for stripping, so long as such mechanical roughening does not unduly damage the underlying floor.

As used in connection with this disclosure, a hardened coating is regarded as being "jobsite-renewable" if, at such time as it may be desired to do so, the coating can be removed from an underlying flooring substrate without removing substantial portions of the flooring substrate, using simple, minimally abrasive measures such as a methylene chloride-free or acetone-free chemical stripper and a mop and detergent solution, mildly abrasive but flooring-safe measures such as a nonwoven floor scrub pad, or other measures such as peeling (and without requiring aggressive removal techniques such as grinding, sanding, sandblasting or a stripper based on methylene chloride or acetone), and then replaced with the same or a substantially similar finish and hardened to provide a visibly smooth tack-free substantially durable film.

As used in connection with this disclosure, an "oligomer" is a polymerizable (e.g., crosslinkable) moiety containing a plurality (e.g., 2 to about 30) of monomer units.

Figure 1:
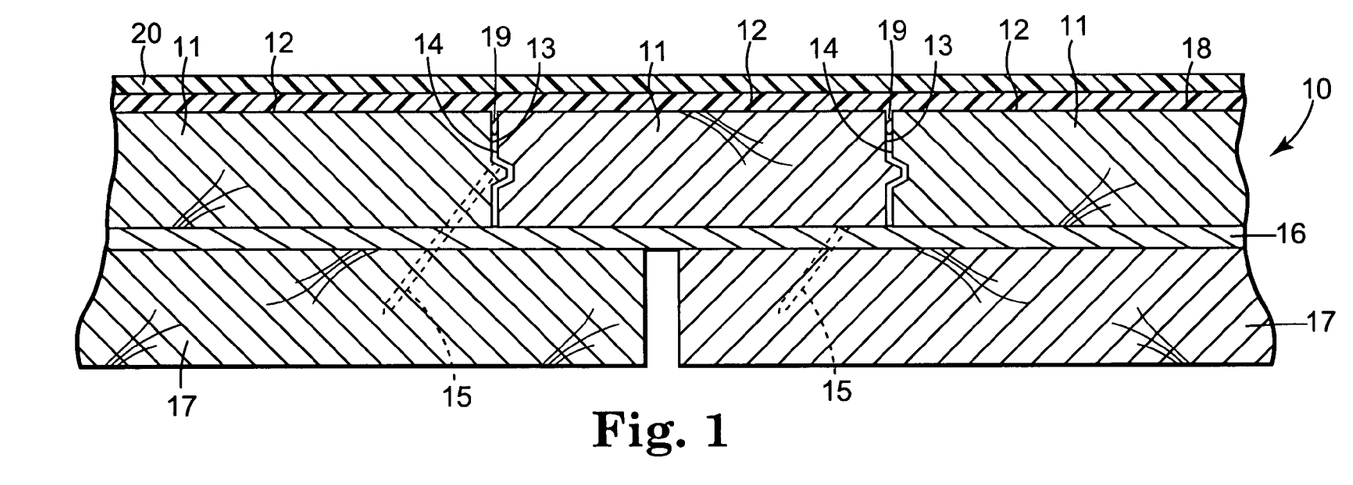
FIG. 1 shows a side view of coated floorboards.

FIG. 1 shows an end view of multipiece flooring material 10 comprising floorboards 11 made of wood, wood fibers, a composite or other suitably durable material. Each floorboard 11 has a top surface 12, side surfaces 13 and 14, and additional side or end surfaces that are not shown in FIG. 1. Fasteners 15 (shown in phantom in FIG. 1) hold floorboards 11 in place on underlayment 16 and subfloor 17. Undercoat 18 coats the top surfaces 12, and fills and seals at least the uppermost portions of the gaps 19 between each floorboard 11. Topcoat 20 lies atop undercoat 18. Following installation of flooring material 10, the tops 12 of floorboards 11 can be sanded so that they are coplanar before topcoat 18 is applied to fill and seal the gaps 19 between floorboards 11. This enables flooring material 10 to have a better appearance and easier cleanability than would be the case if a topcoat had been factory-applied prior to installation of the flooring material. In a multipiece floor made from floorboards whose finish has been factory-applied, there can be small differences in height between adjacent floorboards. This arises because the floorboards cannot be sanded after installation sufficiently to make the tops of the floorboards coplanar without potentially also removing at least some of the factory-applied finish. In such a floor, small gaps between adjacent floorboards typically are not filled or sealed by the factory-applied finish.

Figure 2:
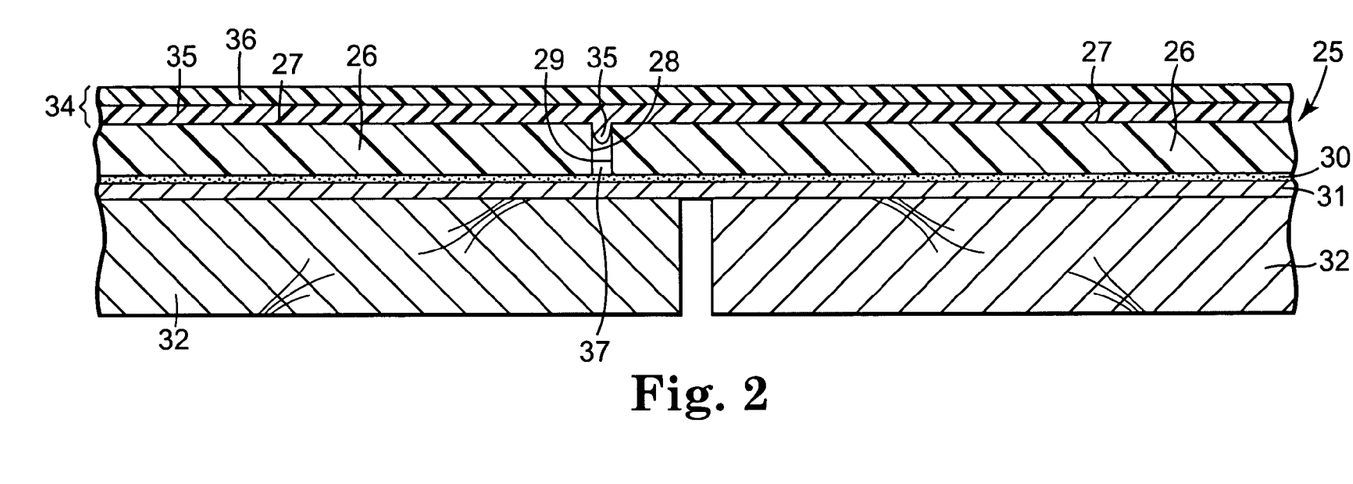
FIG. 2 shows a side view of coated vinyl floor tiles.

FIG. 2 shows an end view of multipiece flooring material 25 comprising vinyl composite tiles 26. Each tile 26 has a top surface 27, side surfaces 28 and 29, and additional side or end surfaces that are not shown in FIG. 1. Adhesive 30 holds tiles 26 in place on underlayment 31 and subfloor 32. Finish 34 includes undercoat 35 atop the tiles 26 and a stripper-permeable topcoat 36 atop undercoat 35. Undercoat 35 coats the top surfaces 27, and fills and seals at least the uppermost portions of the gap 37 between each tile 26.

The multilayer floor finish can be applied to a variety of flooring substrates, including resilient substrates such as sheet vinyl goods (e.g., vinyl flooring or linoleum), vinyl composite tiles and synthetic sports floors, and non-resilient substrates such as concrete, stone, marble, wood, ceramic tile, grout and Terrazzo. The finish can be jobsite-applied to a flooring substrate after the substrate has been installed (e.g., to monolithic flooring substrates such as sheet vinyl goods, synthetic sports floors, concrete, stone, marble, grout or Terrazzo, or to multipiece flooring substrates such as vinyl composite tiles, wood floorboards or ceramic tiles), or can be factory-applied to a flooring substrate before it is installed (e.g., to monolithic flooring substrates such as sheet vinyl goods in roll form, or multipiece flooring substrates such as vinyl composite tiles or wood floorboards). Jobsite application is especially preferred, with suitable jobsites including indoor and outdoor sites involving new or existing residential, commercial and government- or agency-owned facilities.

A variety of undercoat compositions can be employed. Preferred undercoats are film-formers that will adhere to the floor, provide an adherent surface for the topcoat, and be removable using stripping or peeling. Most preferably the undercoat will be strippable using a chemical stripper that is capable of permeating, dissolving, swelling or otherwise softening the topcoat sufficiently so that the agent can act upon the undercoat. Thus the choice of undercoat may be determined in part by the chosen topcoat and stripper. The undercoat desirably should be more strippable than the topcoat. The undercoat can be solvent-borne, waterborne or 100% solids, and can employ a variety of hardening systems. Water-soluble or water dispersible (as is or with a dispersing agent) acid-containing polymers crosslinked using transition metals (e.g., zinc crosslinked acrylics), alkaline earth metals, alkali metals or mixture thereof are a particularly preferred class of undercoats and a particularly preferred hardening system. These polymers preferably can be stripped using a variety of strippers that dissolve the undercoat or attack its crosslinking site. Other materials such as zinc-free acrylic finishes (e.g., acrylic copolymers), polyurethanes (e.g., polyurethane dispersions), acrylic urethanes, water-based (e.g., waterborne) latex emulsions, polyvinyl acetate copolymers (e.g., polyvinyl acetate-polyethylene copolymers), polyvinyl alcohol and its copolymers, polyvinylpyrrolidone and its copolymers, modified cellulose, sulfonated polystyrenes and a variety of other materials that will be familiar to those skilled in the art (e.g., film forming water-soluble or water-dispersible polymers other than those already mentioned) can also be employed as undercoats. The undercoat can if desired be applied in several layers containing different materials in each layer.

The undercoat comprises at least one initiator for the topcoat hardening system. For brevity such an initiator can be referred to as a "topcoat initiator". Preferably the topcoat initiator is not an initiator for the undercoat hardening system. Exemplary topcoat initiators for topcoats employing a polyurethane (polyol/polyisocyanate) hardening system include tin compounds such as dibutyl tin dilaurate, stannous octoate and FASCAT™ 4224 dibutyltin bis(1-thioglycerol) catalyst (commercially available from ATOFINA Chemicals, Inc.); zirconium compounds; amines; and zinc compounds such as zinc crosslinked acrylic dispersions (described further in application Ser. No 10/755,972 entitled AQUEOUS POLYURETHANE COATING SYSTEM CONTAINING ZINC CROSSLINKED ACRYLIC DISPERSION, filed Jan. 12, 2004, the disclosure of which is incorporated herein by reference), ultrafine zinc oxide (described further in application Ser. No. 10/755,975 entitled POLYURETHANE COATING CURE ENHANCEMENT USING ULTRAFINE ZINC OXIDE, filed Jan. 12, 2004, the disclosure of which is incorporated herein by reference) and zinc arbonates including zinc tetraamine carbonate and zinc ammonium carbonate (described further in application Ser. No. 10/755,976 entitled POLYURETHANE COATING CURE ENHANCEMENT USING ZINC CARBONATE INITIATORS, filed Jan. 12, 2004, the disclosure of which is incorporated herein by reference). Mixtures of topcoat initiators may also be employed. The undercoat may if desired be applied in several layers containing at least one topcoat initiator in each layer or in several layers containing topcoat initiator in only some layers (e.g., in only the uppermost undercoat layer). The individual layers need not be homogeneous. For example, the topcoat initiator may if desired "bloom" to the surface of the hardened undercoat.

The undercoat contains sufficient topcoat initiator to decrease the topcoat tack-free time. Preferably the topcoat tack-free time is decreased by at least about 10%, more preferably by at least about 30% and most preferably by at least about 50% compared to a multilayer finish prepared without a topcoat initiator in the undercoat and evaluated using the cotton ball Tack-free Evaluation method (Method 1) described below. As a general numeric guide, the undercoat preferably contains about 1 to about 50 wt. % topcoat initiator, more preferably about 2 to about 30 wt. % topcoat initiator, and most preferably about 2 to about 20 wt. % topcoat initiator based on the total topcoat weight. Preferably the undercoat and the topcoat initiator are combined, prior to or at the job site, using stirring or other methods that will be apparent to those skilled in the art.

The undercoat preferably contains water or another suitable diluent, plasticizer or coalescent, including compounds such as benzyloxyethanol; an ether or hydroxyether such as ethylene glycol phenyl ether (commercially available as "DOWANOL EPh" from Dow Chemical Co.) or propylene glycol phenyl ether (commercially available as "DOWANOL PPh" from Dow Chemical Co.); dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products available under the trade designations DBE, DBE-3, DBE-4, DBE-5, DBE-6, DBE-9, DBE-IB, and DBE-ME from DuPont Nylon); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate; and mixtures thereof. Cosolvents can also be added if desired to assist in formulating and applying the undercoat. Suitable cosolvents include Butoxyethyl PROPASOL™, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL™ acetate, Methyl PROPASOL™, Propyl CARBITOL™, Propyl CELLOSOLVE™, Propyl DIPROPASOL™ and Propyl PROPASOL™, all of which are available from Union Carbide Corp.; and mixtures thereof. The concentration may vary depending in part on the other undercoat ingredients and on the intended application and application conditions. As a general guide, when water alone is used as a diluent, the water concentration preferably is from about 15 to about 98 wt. % based on the undercoat solution weight. More preferably, the undercoat contains about 25 to about 95 wt. % water, and most preferably about 60 to about 95 wt. % water. If a diluent, plasticizer, coalescent or cosolvent other than water is included in the undercoat solution, then its concentration preferably is from about 0.1 to about 10 wt. % based on the weight of polymerizable solids in the undercoat, and more preferably about 1 to about 7 wt. %.

The undercoat can contain a variety of adjuvants to alter the performance or properties of the undercoat before or after application to a floor. Useful adjuvants include inorganic particles, organic (e.g., polymeric) particles, flatting agents, surfactants, surface slip modifiers, defoamers, waxes, indicators, UV absorbers, light stabilizers, antioxidants, plasticizers, coalescents and adhesion promoters. The types and amounts of such adjuvants will be apparent to those skilled in the art. The undercoat can also contain a lightening agent (described further in application Ser. No. 10/756,120 entitled FLOOR FINISH WITH LIGHTENING AGENT, filed Jan. 12, 2004, the disclosure of which is incorporated herein by reference).

Often it will be convenient to prepare the undercoat by adding the chosen topcoat initiator to a commercially available one part floor finish material such as PADLOCK™, GEMSTAR LASER™ and TAJ MAHAL™ acrylic floor finishes and COURTMASTER II™ urethane floor finish from Ecolab Inc.; CORNERSTONE™ and TOPLINE™ acrylic floor finishes from 3M; HIGH NOON™ acrylic finish from Butchers; CITATION™ acrylic finish from Buckeye International, Inc., COMPLETE™, SIGNATURE™, TECHNIQUE™ and VECTRA™ acrylic floor finishes from SC Johnson Professional Products; SPLENDOR™, DECADE 90™, PRIME SHINE™ ULTRA and PREMIER™ acrylic finishes and FIRST ROUND and FORTRESS™ urethane acrylic finishes from Minuteman, International, Inc.; FLOORSTAR™ Premium 25 floor finish from ServiceMaster, Inc.; UPPER LIMITS™ acrylic finish from Spartan Chemical Co.; ROSHIELD™ 3120 UV curable acrylate coating from Rohm & Haas, taken alone or blended with styrene maleic anhydride polymer as described in PCT Published Patent Application No. 98/11168; and materials such as those described in U.S. Pat. Nos. 4,517,330 and 5,319,018 and the patents cited therein. Strippable floor coatings designated as "sealers" (e.g., OVER AND UNDER™ floor sealer from S. C. Johnson Professional Products and ACRYL-KOTE™ Seal and Finish and PREP Floor Seal from Minuteman, International, Inc.), strippable coatings based on polyvinylacetates and blends of any of the foregoing may also be employed. Some polymer emulsions (e.g., the emulsion DURAPLUS™ 3, a zinc crosslinked acrylic dispersion used as an ingredient in some floor finishes, and commercially available from Rohm & Haas Co.) contain sufficiently high levels of initiator that the emulsion can be used as is as an undercoat (without further addition of a topcoat initiator) together with a compatible topcoat such as a two component polyurethane. A variety of other commercially available polymer emulsions and other commercially available floor finishes may also be used in admixture with other undercoat materials. The undercoat may if desired be a pigmented coating or paint. If desired, two or more layers of different undercoats can be employed in order to optimize properties such as adhesion to the floor or to the topcoat, wear resistance, strippability, etc.

A variety of topcoat formulations can be employed in the multilayer finishing systems. Preferred topcoats will adhere to the undercoat, will provide a wear-resistant surface and will be removable using stripping or peeling. Preferably the topcoat is permeable, soluble or swellable by a chemical stripper that is capable of stripping the undercoat. Most preferably the topcoat is less strippable than the undercoat. The choice of topcoat may be determined in part by the chosen undercoat, topcoat initiator in the undercoat, and stripping agent. Preferably the topcoat and undercoat are chosen so that the multilayer finish will be removable in less than 20 minutes using an appropriate chemical stripper. The topcoat as mixed or dispensed can be solvent-borne, waterborne or 100% solids. The topcoat may contain one or more oligomers or polymers, e.g., acrylic acid-functional, amine functional, amido functional, isocyanate-functional or hydroxyl-functional oligomers or polymers. The unhardened topcoat also preferably is water-soluble or water-dispersible. Water solubility or water dispersibility can be facilitated in a variety of ways that will be familiar to those skilled in the art, including incorporating an appropriate oligomer or appropriate functional groups in the topcoat formulation, forming a salt of a component of the topcoat formulation, or adding a suitable cosolvent or surfactant to the topcoat formulation. The topcoat can employ a variety of hardening systems. Preferred topcoat materials include acrylates, urethanes, ureas, vinyl ethers, unsaturated polyesters, melamines, and blends or copolymers thereof. Epoxies can also be used as topcoats although they can be more difficult to strip chemically and may be better suited to removal by peeling. Waterborne acrylates, urethanes and ureas, and especially two-component or so-called "2K" aqueous polyurethanes, polyureas or combinations thereof, are particularly preferred topcoat materials. These tend to be less strippable and more wear resistant than the metal crosslinked acrylic undercoats mentioned above, and appear to be permeable by strippers that can attack the undercoat. Especially preferred topcoats include those formed from the reaction of a (i) polyol such as a polyester polyol, polyether polyol, acrylic polyol, polyurethane polyol or combination thereof and (ii) a polyisocyanate such as a blocked or unblocked aliphatic or aromatic isocyanate oligomer. If desired, two or more layers of different topcoats can be employed in the multilayer finish, in order to optimize properties such as adhesion to the undercoat, finish surface appearance, overall wear resistance, finish strippability, etc.

Suitable commercially or experimentally available two-part waterborne topcoat materials include two-part acrylates, urethanes and urethane acrylates (including aliphatic polyester urethane acrylates). The topcoat may if desired be a pigmented coating or paint. Representative formulations are available from a number of suppliers including Air Products and Chemicals, Inc. (e.g., No. AD200C1 polyester polyurethane formulation), Bayer AG (e.g., No. MG98-040 polyester polyurethane formulation), Reichhold, Inc. (e.g., No. STAYCLAD™ 5900 hydroxyl-functional acrylic polymer dispersion and No. 3955-24W acrylic polyurethane formulation), U.S. Polymers, Inc. (e.g., Nos. 979-1 and 980-3 polyester polyurethane formulations) and Zeneca Resins (e.g., No. G-2029 acrylic polyurethane formulation).

The topcoat can also contain a topcoat initiator, such as the topcoat initiators mentioned above. This can further increase the topcoat hardening rate compared to addition of the topcoat initiator to the undercoat alone. However, the topcoat should not contain excessively high levels of the topcoat initiator lest pot life be unduly shortened. When present in the topcoat, the topcoat initiator concentration preferably is sufficiently low so that the topcoat has a pot life of at least about 30 minutes, more preferably at least about 1 hour, and yet more preferably at least about 2 to about 5 hours. For example, the topcoat initiator concentration preferably may represent about 10 ppm to about 7 wt. % of the topcoat hardening system polymerizable solids weight.

The topcoat preferably contains water or another suitable diluent, plasticizer, coalescent or cosolvent such as those described above in connection with the undercoat, at a concentration which may vary depending in part on the other topcoat ingredients and on the intended application and application conditions. As a general guide, when water alone is used as a diluent, the water concentration preferably is from about 15 to about 85 wt. % based on the topcoat weight. More preferably, the topcoat contains about 25 to about 75 wt. % water, and most preferably about 35 to about 70 wt. % water. If a diluent, solvent, plasticizer or cosolvent other than water is included in the topcoat, then its concentration preferably is from 0.1 to about 10 wt. % based on the topcoat solution weight, and more preferably about 1 to about 7 wt. % diluent or cosolvent.

The topcoat can contain a variety of adjuvants to alter its performance or properties before or after application to a floor. Useful adjuvants include hardening retarders (which function as pot life extenders) and the adjuvants mentioned above in connection with the undercoat.

The topcoat may contain inorganic or organic particles (or both inorganic and organic particles) to enhance the abrasion resistance, scratch resistance, wear resistance or strippability of the multilayer finish. Preferred inorganic particles are described in copending U.S. Pat. No. 6,800,353 B1 entitled SCRATCH-RESISTANT STRIPPABLE FINISH, the disclosure of which is incorporated herein by reference. Representative inorganic particles include silicas such as fumed silicas, stabilized silica sols, silica organosols, silicon dioxide particles, colloidal silicas and spherical silicas; aluminas such as aluminum oxide particles and alumina modified colloidal silica; and glasses such as glass beads and glass microbubbles. Representative organic particles include EXPANCEL™ spherical plastic microspheres, commercially available from Akzo Nobel N.V., HYDROPEL™ QB organic particles and NON-SKID™ modified polypropylene waxes, both commercially available from Shamrock Technologies, Inc. Although the inorganic or organic particles may if desired be obtained in dry powder form, preferably they are employed in aqueous or solvent-based dispersions, as such dispersions are much more easily combined with the topcoat. The particles can also be surface-modified, e.g., to improve their dispersibility in the topcoat. In general, solvent-based particle dispersions can easily be combined with waterborne topcoats and generally can provide good gloss and good film integrity in the cured coating. However, solvent-based particle dispersions tend to be more expensive than aqueous particle dispersions. When waterborne particle dispersions are combined with waterborne topcoats, the resulting coating may have somewhat lower gloss and film integrity. We prefer in such circumstances to combine a waterborne particle dispersion with a suitable dispersing solvent (e.g., alcohols such as methanol, ethanol or isopropyl alcohol) that will dissolve in or be miscible with both water and the topcoat, and that will help to disperse the particles in the topcoat. The resulting mixture of waterborne particles and dispersing solvent can be combined with the topcoat and mixed using a suitable mixing device such as a sonic mixer.

Suitable inorganic and organic particles are available in a wide variety of average particle diameters. Small diameter particles tend to provide better adhesion of the topcoat to the underlying layers, but also tend to be more expensive than large diameter particles. Large particles may provide better surface scratch resistance. Preferably, the average particle diameter is about 3 to about 10,000 nanometers, more preferably about 12 to about 7,500 nanometers. In some cases, use of a bimodal mixture of small and large diameter particles can provide a cured finish having an optimal balance of good coating properties, scratch resistance and durability. The topcoat preferably contains sufficient inorganic or organic (or both inorganic and organic) particles to provide increased scratch resistance compared to a topcoat that does not contain such particles. If desired, large amounts of inorganic or organic particles can be employed, so long as the other properties of the topcoat are not unduly harmed by the thickening effect or loss of gloss caused by the particle addition. However, particle additions in relatively small amounts may provide a significant improvement in scratch resistance. Preferably, the topcoat contains about 1 to about 50 wt. % inorganic or organic particles based on the weight of polymerizable solids in the topcoat. More preferably, the topcoat contains about 1 to about 25 wt. % inorganic or organic particles, and most preferably about 1 to about 10 wt. % inorganic or organic particles.

The multilayer coating compositions can be applied using a variety of methods, including spraying, brushing, flat or string mopping, roll coating and flood coating. Mop application, especially flat mopping, is preferred for coating most floors. Suitable mops include those described in U.S. Pat. Nos. 5,315,734, 5,390,390, 5,680,667 and 5,887,311. Typically, the floor should first be cleaned and any loose debris removed. One or more undercoat layers or coats (diluted if necessary with water or another suitable diluent, plasticizer, coalescent or cosolvent) are applied to the floor. One to three undercoat layers typically will be preferred. When multiple undercoat layers are employed they can be the same or different. For example, the film-forming portion of the various undercoat layers may be different, and only the uppermost layer need contain a topcoat initiator. Each undercoat layer preferably will have a dry coating thickness of about 2.5 to about 25 μm, more preferably about 2.5 to about 15 μm. Preferably the overall undercoat dry coating thickness will be about 5 to about 100 μm, and more preferably about 5 to about 50 μm.

After the undercoat has hardened sufficiently so that its visual and physical properties have developed and it is safe to apply a topcoat layer, the topcoat (diluted if need be with water or with another suitable diluent or cosolvent) is mixed, dispensed or otherwise processed to initiate hardening and a first topcoat layer applied to the floor. The degree of undercoat hardening that will be deemed sufficient for such topcoat application and the associated waiting period will usually vary depending on factors such as the undercoat and topcoat formulations, undercoat coating thickness, ambient conditions and topcoat coating method, and typically may involve a wait of about 15 minutes to about one hour before topcoat application. Full hardening of the undercoat may not be needed before the topcoat can safely be applied. In many instances safe application of the topcoat layer will be possible once it is possible to walk on the undercoat without marring it.

The first topcoat layer preferably is applied before the topcoat pot life elapses. After the first topcoat layer has hardened sufficiently, the floor can if desired be overcoated with additional (e.g., one to three) topcoat layers using similar mixing, application and hardening steps. These additional topcoat layers can utilize the same or different hardening mechanisms. The presence of the topcoat initiator in the undercoat appears primarily to affect the tack-free time for the first topcoat layer. If the first topcoat layer is allowed to harden sufficiently so that it can be walked upon, then the tack-free time for subsequent topcoat layers may not be greatly influenced by the presence of the initiator. However, if such subsequent topcoat layers are applied before the first topcoat layer reaches a walk-on state then some reduction in tack-free time may be observed in the subsequent layers, but to a lesser extent than for the first topcoat layer. The undercoat may be formulated with a view to promoting the efficacy of the initiator in reducing topcoat tack-free times. The topcoat usually is formulated with a view to attaining high durability, a factor that may reduce the efficacy of the initiator with respect to such subsequent topcoat layers. Each topcoat layer preferably will have a dry coating thickness of about 2.5 to about 200 μm, more preferably about 2.5 to about 100 μm. Preferably the overall topcoat dry coating thickness will be relatively thin in order to reduce raw material costs, e.g., about 5 to about 150 μm, and more preferably about 5 to about 40 μm. The multilayer finish preferably will have an overall dry coating thickness of about 10 to about 500 μm, and more preferably about 10 to about 80 μm.

The floor can be placed into service (or returned to service) once the finish has hardened sufficiently to support normal traffic without marring. Inclusion in the undercoat of the topcoat initiator promotes faster topcoat cure and enables the floor to be subjected to normal traffic much earlier than if the initiator is not employed.

The finish can receive normal maintenance until such time as it is desired to remove and renew it. Removal can be carried out, for example, by cleaning the floor (using e.g., a brush or mop) followed by application of a stripper. The chosen stripper may depend in part on the chosen undercoat and topcoat. Preferred strippers include compositions containing phenyl alcohols (e.g., benzyl alcohol); alkoxy ethers (e.g., glycol ethers such as propylene glycol methyl ether and ETHYL CARBITOL™, BUTYL CARBITOL™ and BUTYL CELLOSOLVE™ solvents from Union Carbide Corp.); alkoxy esters; aryloxy alcohols (e.g., phenoxy ethanol and phenoxy propanol); dibasic esters; N-alkyl pyrrolidones, ketones, esters, metasilicates; amines (e.g., ethanolamine); alkanolamines (e.g., monoethanolamine); acid based agents and caustic agents (e.g., sodium or potassium hydroxide). Strippers containing phenyl alcohols are especially preferred for stripping multilayer finishes employing acrylate or urethane topcoats owing to the relatively high rate at which phenyl alcohols penetrate such topcoats and their ease of use and low odor. A particularly preferred stripper concentrate contains a polar solvent that is denser than water and a sufficiently low level of cosolvent or surfactant so that upon mixing with water a pseudo-stable aqueous dispersion forms which will phase-separate following application to a surface. Concentrates of this type are described in U.S. Pat. No. 6,544,942. Another preferred stripper concentrate contains about 1 to 75 wt. percent of an ether alcohol solvent having a solubility in water of less than about 5 wt. % of the solvent, and about 1 to 75 wt. % of an ether alcohol solvent/coupler having a solubility in water of about 20 to about 100 wt. % of the solvent/coupler, wherein the vapor pressure of the concentrate is less than 1 millimeter Hg. Concentrates of this type are described in U.S. Pat. No. 6,583,101. The stripper can contain a variety of adjuvants to alter the performance or properties of the stripper before or after application to a cured finish. Useful adjuvants include abrasive particles, surfactants, defoamers, indicators, slip reducing agents, colorants and disinfectants. The types and amounts of such adjuvants will be apparent to those skilled in the art.

The stripper should be allowed to stand for a suitable time (e.g., for a minute or more, preferably for two hours or less, and most preferably for between about 5 minutes and about 1 hour) while it softens the finish. After the finish softens sufficiently it can be removed using a variety of techniques including scrubbing, vacuuming, mopping, use of a squeegee, scraping, sweeping or wiping. Removal will usually be made easier if water or a suitable detergent solution is applied to the softened finish. The floor can be allowed to dry and new layers of the undercoat and topcoat applied to renew the finish.

The multilayer finish typically will be sold in the form of a kit including the undercoat and topcoat in suitable containers or dispensers together with suitable instructions for mixing or dispensing any undercoat and topcoat components as needed and for applying the undercoat atop a floor and applying the topcoat atop the undercoat. If desired, the undercoat or topcoat could be packaged as concentrates intended to be mixed with water or another suitable solvent prior to application. Optionally the kit may include a stripper concentrate in a suitable container. The stripper concentrate typically will be mixed with water or another suitable carrier at, for example, about 5-30% by weight active ingredients prior to application. The kit can also contain additional undercoat materials (e.g., leveling coatings) that can be applied to the floor before application of the undercoat and topcoat, or various topcoat materials (e.g., maintenance coats or wax finishes) that can be applied atop the topcoat. Maintenance coats typically will be applied when the initially-applied multilayer coating exhibits noticeable wear or loss of gloss, and typically will be applied at solids levels that are the same as or somewhat less than the solids levels of the initially-applied topcoat.

If desired, the multilayer floor finishes can be factory-applied to a variety of flooring substrates. For example, when factory-applied to a multipiece flooring material, the pieces typically will be coated on at least the top surface and optionally coated or partially coated on the side or bottom surfaces.

The invention is further illustrated in the following non-limiting examples, in which all parts and percentages are by weight (wt.) unless otherwise indicated.

Tile Preparation

Industrial black and white 305 mm×305 mm vinyl composition tiles (commercially available from the Congoleum Corporation) were used in all examples. Before use, the tile surfaces were cleaned and roughened until no longer shiny, by rubbing with MAGICSCRUB™ mild abrasive cleaner (commercially available from Ecolab Inc.) using a non-woven SCOTCH-BRITE™ green abrasive scrub pad (commercially available from 3M Company). The cleaned tiles were rinsed with tap water and dried at room temperature. This removed all factory applied coatings and surface soil, and provided a consistently reproducible surface.

Undercoat Formulations and Coating Method

PADLOCK™ metal crosslinked acrylic polymer-based floor finish (commercially available from Ecolab Inc. and identified below as Undercoat No. 1) and PREMIUM 25™ acrylic polymer-based floor finish (commercially available from Aramark Corporation and identified below as Undercoat No. 2) were both modified by adding various topcoat initiators. A zinc crosslinked acrylic dispersion floor finish containing a large concentration of the zinc crosslinking agent (DURAPLUS™ 3 floor finish, 38% nonvolatiles, commercially available from Rohm & Haas Co. and identified below as "DP3") was used as is or in admixture with Undercoat No. 2. The tiles were coated by applying a weighted undercoat amount in two layers to the cleaned tile surface using commercially available microfiber pads, at a wet coating rate of about 48 $m^2$/liter. The first and subsequent undercoat layers were allowed to air dry for at least 15 minutes before applying any further undercoat layers.

Topcoat Formulations and Coating Method

Two-component topcoat formulations based on a commercially available polyester polyol resin (BAYHYDROL™ XP-7093, 30% nonvolatiles, Bayer Corporation), and commercially available hexamethylene diisocyanates (DESMODUR™ N-3600 or BAYHYDUR™ XP-7165, both from Bayer Corporation) were prepared as follows. The polyester polyol component (designated as Part A in Table 1) was made by mixing the polyol, surfactants and water as set out below. Part A was combined with the isocyanate component (designated Part as B in Table 1) according to the weight ratios given in Table 1. The topcoat components were mixed vigorously for three minutes, then allowed to sit for 10 to 12 minutes before applying a pre-weighed amount of the topcoat atop the air-dried undercoat using a flocked pad, at a wet coating rate of about 16-18.4 $m^2$/liter. In one instance (Topcoat No. 2), deionized water was stirred into the mixture of Part A and Part B just prior to topcoat application. The topcoated tiles were allowed to dry at room temperature. The dried tiles had a tack-free, glossy finish made from a polyacrylate-based undercoat and a polyurethane-based topcoat.

TABLE 1

| | Ingredient | Top coat No. 1 Parts by weight | Top coat No. 2 Parts by weight | Top coat No. 3 Parts by weight | Top coat No. 4 Parts by weight | Top coat No. 5 Parts by weight | Top coat No. 6 Parts by weight | Top coat No. 7 Parts by weight |
|---|---|---|---|---|---|---|---|---|
| Part A | Polyester polyol[1] | 91.46 | 100 | 88.90 | 54.95 | 91.46 | 91.46 | 91.46 |
| | Silicone defoamer[2] | 0.13 | 0.13 | 0.13 | 0.08 | 0.13 | 0.13 | 0.13 |
| | Wetting agent[3] | 0.80 | 0.80 | | | 0.8 | 0.8 | 0.8 |
| | Surface agent[4] | | | 0.06 | 0.04 | | | |
| | Surface agent[5] | | | 1.16 | 0.77 | | | |
| | Deionized water | 7.61 | | 9.75 | 10.09 | 7.61 | 7.61 | 7.61 |
| Part B | Hexamethylene diisocyanate[6] | 20.03 | 21.47 | 39.78 | | 4.83 | 5.4 | 5.94 |
| | Hydrophilic hexamethylene diisocyanate[7] | 13.35 | 13.49 | 100 | 23.38 | 2.07 | 1.35 | 0.66 |
| Mix Ratios | Part A | 24.62 | 20.68 | 22.5 | 22.15 | 20.0 | 20.0 | 20.0 |
| | Part B | 7.86 | 7.16 | 7.5 | 7.85 | 6.9 | 6.6 | 6.75 |
| | Deionized water | | 2.16 | | | | | |

[1]BAYHYDROL ™ XP-7093, 30% nonvolatiles, Bayer Corporation.
[2]BYK ™ 025, BYK Chemie.
[3]BYK ™ 346, BYK Chemie.
[4]BYK ™ 348, BYK Chemie.
[5]BYK ™ 380, BYK Chemie.
[6]DESMODUR ™ N-3600, Bayer Corporation.
[7]BAYHYDUR ™ XP-7165, Bayer Corporation.

Film Evaluation

The coated tiles were evaluated to assess tack-free time, solution pot life, gloss and removability, as follows:

Tack-free Evaluation

Two methods were used to assess topcoat tack-free time. In Method 1, a finger was used to press a cotton ball or paper towel gently against the topcoat surface at various time intervals following application. The cotton was removed and the presence of any fibers retained by the coating noted. The tack-free time was defined as the interval after which no fibers were retained on the tested coating surface. In Method 2, a small (7.6 mm×7.6 mm) cotton square was placed on the coating surface and covered with a 2 kg weight for 30 seconds. The weight was removed and the cotton lightly brushed or rubbed away using a finger. Any substantially noticeable amount of fibers remaining on the topcoat indicated the topcoat was still tacky and that the tack-free time had not been reached. For either method, coating surfaces that exhibited a shorter tack-free time tended to cure or harden more quickly overall than coatings with longer tack-free times.

Topcoat Pot Life Evaluation

Topcoat pot lives were determined by observing the elapsed time between the start of mixing and the first visual appearance of a precipitate or gel in the topcoat. The longer it took for precipitation to occur or for a gel to appear, the better the pot life.

Gloss

Film gloss was measured at 60° and 20° using a Micro-TRI-Gloss meter (commercially available from Paul N. Gardner Co., Inc.). An average of 10 readings was reported. The standard deviation for individual samples was less than 3%.

Strippability

Chemical-physical removability (strippability) was evaluated by affixing an adhesive-backed foam ring to the topcoated surface. The inner portion of each ring was filled with a 13 wt. % aqueous solution of the stripper shown below in Table 2. The resulting aqueous stripper solution was allowed to contact the coating surface for 10 to 20 minutes and then poured out of the ring. The coating surface was rinsed with tap water. The treated area was viewed in relation to the untreated area by peeling the foam ring away from the coating and briefly wiping with a paper towel to remove loose finish. A visually determined percent coating removal was recorded, with higher removal values indicating more removable coatings and a 100% value indicating complete removal.

TABLE 2

| Stripper | |
|---|---|
| Ingredient | Parts |
| Benzyl Alcohol[1] | 57.03 |
| Monoethanolamine, 99%[2] | 22.81 |
| Diethylene glycol monobutyl ether[3] | 5.703 |
| Dipropylene glycol n-butyl ether[4] | 5.703 |
| Propylene glycol phenyl ether[5] | 5.703 |
| Surface active agent[6] | 1.901 |
| Wetting agent[7] | 0.115 |
| Deionized water | 1.035 |
| TOTAL | 100 |

[1]Benzyl alcohol, technical grade, Velsicol Chemical.
[2]Monoethanolamine, 99%, Dow Chemical.
[3]Diethylene glycol monobutyl ether, 99%, Equistar.
[4]Dipropylene glycol n-butyl ether, 98.5%, Dow Chemical.
[5]Propylene glycol phenyl ether, Dow Chemical.
[6]Linear Alcohol (C12-15) ethoxylate 9 EO, Rhodia.
[7]ZONYL ™ FSJ, 40% active, Dupont.

EXAMPLE 1

Undercoat No. 2 was applied with and without an added topcoat initiator to vinyl composition tiles cleaned as described above. The undercoat became dry to the touch within about 30 minutes, and was allowed to dry for a further 90 minutes prior to topcoat application to ensure complete dryness. Run No. 1-1 had no topcoat initiator in the undercoat or topcoat. In Run No. 1-2, a topcoat initiator (NanoTek™ aqueous zinc oxide dispersion, 52%, commercially available from Nanophase Technologies Corporation, and identified below as "ZnO") was added to Undercoat No. 2 prior to coating with Topcoat No. 4. In Run no. 1-3, the same topcoat initiator was stirred into Part A of Topcoat No. 4 before Part A was mixed with Part B. The tack-free times for the coated tiles were determined using Evaluation Method 2. The pot life times for the topcoat coating solutions were determined as described above. The results are shown below in Table 3.

TABLE 3

| | Undercoat | | Topcoat | | Results | |
|---|---|---|---|---|---|---|
| Run No. | Initiator Identity | Initiator Conc., % | Identity | Initiator Conc., % | Tack-free Time (hours:min) | Topcoat Pot Life (hours:min) |
| 1-1 | none | No. 2 | 0 | No. 4 | 0 | 9:00 | >3:00 |
| 1-2 | ZnO | No. 2 | 9.8% | No. 4 | 0 | 3:00 | >3:00 |
| 1-3 | ZnO | No. 2 | 0 | No. 4 | 0.07 | 3:30 | 1:12 |

The results in Table 3 demonstrate that adding 9.8% of a zinc oxide initiator (19% as a dispersion) to the undercoat reduced the topcoat tack-free time 60% or more without reducing the topcoat pot life (compare Run No. 1-1 to Run No. 1-2). Adding 0.07% of the initiator to a topcoat also reduced the topcoat tack-free time but reduced topcoat pot life as well (compare Run No. 1-1 to Run No. 1-3).

EXAMPLE 2

Using the method of Example 1 and various undercoat drying times, dibutyltin bis(1-thioglycerol) (FASCAT™ 4224, commercially available from Atofina Chemicals, Inc. and identified below as "F4224") was evaluated as a topcoat initiator in Undercoat No. 2 and coated with Topcoat No. 1. The initiator concentration (reported as the wt. % of FASCAT 4224 in the coating solution), topcoat tack-free times and solution pot lives are shown below in Table 4.

The results in Table 4 demonstrate that adding dibutyltin bis(1-thioglycerol) to the undercoat could reduce the topcoat tack-free time without reducing the topcoat pot life. The results were affected by the initiator concentration in the undercoat (compare Run Nos. 2-1 and 2-2 to Run Nos. 2-3 through 2-6) and by the undercoat drying time (compare Run No. 2-2 to Run Nos. 2-4 through 2-6). As with Example 1, adding the topcoat initiator to the topcoat rather than to the undercoat reduced the topcoat tack-free time but severely reduced topcoat pot life (compare Run No. 2-2 to Run Nos. 2-7 and 2-8).

Film gloss for Run Nos. 2-1, 2-5, 2-7 and 2-8 was measured at 60° and 20°, yielding the results shown below in Table 5:

TABLE 5

| | | Undercoat | | | Topcoat | | | |
|---|---|---|---|---|---|---|---|---|
| Run No. | Initiator Identity | Identity | Initiator Conc., % | Drying Time, min | Identity | Initiator Conc., % | Gloss 60° | 20° |
| 2-1 | None | No. 2 | 0 | 60 | No. 1 | 0 | 90 | 78 |
| 2-5 | F4224 | No. 2 | 2.4 | 60 | No. 1 | 0 | 91 | 79 |
| 2-7 | F4224 | No. 2 | 0 | 60 | No. 1 | 0.07 | 90 | 64 |
| 2-8 | F4224 | No. 2 | 0 | 60 | No. 1 | 0.24 | 82 | 38 |

The results in Table 5 and Table 4, taken together, demonstrate that the addition of an initiator to the undercoat could provide a reduction in topcoat tack-free time without reduc-

TABLE 4

| | Undercoat | | | Topcoat | | Results | |
|---|---|---|---|---|---|---|---|
| Run No. | Initiator Identity | Initiator Conc., % | Drying Time, min | Identity | Initiator Conc., % | Tack-Free Time, hours:Min | Topcoat Pot Life, hours:Min |
| 2-1 | None | No. 2 | 0 | 60 | No. 1 | 0 | 7:30 | 2:30 |
| 2-2 | None | No. 2 | 0 | 160 | No. 1 | 0 | 7:30 | 2:37 |
| 2-3 | F4224 | No. 2 | 1.5 | 160 | No. 1 | 0 | 7:30 | 2:37 |
| 2-4 | F4224 | No. 2 | 2.5 | 15 | No. 1 | 0 | 4:30 | N.D.* |
| 2-5 | F4224 | No. 2 | 2.4 | 60 | No. 1 | 0 | 5:00 | N.D.* |
| 2-6 | F4224 | No. 2 | 2.5 | 960 | No. 1 | 0 | 7:00 | 2:45 |
| 2-7 | F4224 | No. 2 | 0 | 60 | No. 1 | 0.07 | 4:30 | 0:59 |
| 2-8 | F4224 | No. 2 | 0 | 60 | No. 1 | 0.15 | 3:00 | 0:23 |

*N.D. = Not Determined ing gloss levels. When the initiator was added to the topcoat, reduced gloss levels were observed.

EXAMPLE 3

Using the general method of Example 1 but with overnight drying of the second layer of Undercoat No. 1 before application of the first layer of Topcoat No. 3, zinc tetraamine carbonate (15% zinc (as ZnO), CAS 38714-47-5, low pH version containing about 12-16% ammonia, commercially available from ChemCor and identified by the manufacturer as "zinc ammonium carbonate" and identified below as "ZTC") was evaluated as a topcoat initiator. The initiator concentrations in the undercoat (reported as the equivalent wt. % of zinc oxide) and the topcoat tack-free times are shown below in Table 6.

TABLE 6

| Run No. | Initiator | Under coat | Initiator Conc. In Undercoat, % | Top coat | Tack-free time (hours:min) |
|---|---|---|---|---|---|
| 3-1 | None | No. 1 | 0.0 | No. 3 | 7:00 |
| 3-2 | ZTC | No. 1 | 0.11 | No. 3 | 7:30 |
| 3-3 | ZTC | No. 1 | 0.72 | No. 3 | 5:00 |
| 3-4 | ZTC | No. 1 | 1.6 | No. 3 | 4:00 |

The results in Table 6 demonstrate that adding zinc tetraamine carbonate initiator to the undercoat could substantially reduce the topcoat tack-free time (compare Run No. 3-1 to Run Nos. 3-3 and 3-4). In this instance a 0.11% addition (Run No. 3-2) did not reduce the tack-free time, but larger amounts were effective in doing so.

EXAMPLE 4

The zinc content in a zinc crosslinked acrylic polymer emulsion (DURAPLUS™ 3 dispersion, 38% nonvolatiles, commercially available from Rohm & Haas Co. and identified below as "DP3") was determined using inductively coupled plasma ("ICP") analysis carried out as follows. Approximately 1.0 g of the emulsion was weighed in a 100 ml beaker and dried in a muffle furnace at 200° C. until no liquid was left. The sample was then ashed at 600° C. overnight, cooled, dissolved in 20 ml nitric acid and heated on a hotplate until approximately 3 ml. of analyte remained in the beaker. The analyte was filtered through a glass fiber filter, diluted to volume with nanopure water in a 50 ml. volumetric flask and analyzed for elemental zinc using a thermo-elemental IRIS simultaneous ICP apparatus (Thermo Electron Corp.). The analysis indicated that DURAPLUS 3 polymer emulsions contained 1.4% zinc.

Using the general method of Example 3 including the overnight drying step, DURAPLUS 3 floor finish was combined with varying amounts of Undercoat No. 2 and coated with Topcoat No. 4. The resulting mixtures thus evaluated the efficacy of the crosslinking agent in DURAPLUS 3 floor finish as a topcoat initiator for the two-component polyurethane formulation in Topcoat No. 4. The mixture made entirely from DURAPLUS 3 polymer emulsion did not coat well, and had a dry, powdery appearance. However, as shown below in Table 7, it initiated the cure of the topcoat formulation.

TABLE 7

| Run No. | Initiator | Under coat | Zinc Conc. In Undercoat, % | Top coat | Tack-free time (hours:min) |
|---|---|---|---|---|---|
| 4-1 | None | No. 2 | 0.0 | No. 4 | >7:30 |
| 4-2 | From DP3 | 75% No. 2 + 25% DP3 | ~0.4 | No. 4 | 7:30 |
| 4-3 | From DP3 | 50% No. 2 + 50% DP3 | ~0.7 | No. 4 | 7:30 |
| 4-4 | From DP3 | DP3 | ~1.4 | No. 4 | 4:30 |

The results in Table 7 demonstrate that the crosslinking agent in DURAPLUS 3 polymer emulsion could substantially reduce the topcoat tack-free time (compare Run No. 4-1 to Run No. 4-4). In this instance additions containing 0.4% and 0.7% zinc (Run Nos. 4-2 and 4-3) did not reduce the tack-free time, but a larger amount was effective for doing so.

EXAMPLE 5

The extent to which several of the multilayer coating compositions could be chemically stripped was evaluated using the above-described Strippability test. The topcoat initiators abbreviated above as "ZTC" and "ZnO" were employed in several undercoat formulations. The ZTC initiator concentration (reported as the equivalent wt. % of zinc oxide), zinc oxide concentration (reported as the wt. % of zinc oxide), tack-free times and strippability results are shown below in Table 8:

TABLE 8

| | | Undercoat | | Topcoat | | Results | |
|---|---|---|---|---|---|---|---|
| Run No. | Initiator | Identity | Initiator Conc., % | Identity | Initiator Conc., % | Tack-free Time (hours) | % Removal |
| 5-1 | None | No. 1 | 0 | No. 3 | 0 | 7 | 100 |
| 5-2 | ZTC | No. 1 | 1.22 | No. 3 | 0 | 4 | 100 |
| 5-3 | None | No. 2 | 0 | No. 4 | 0 | 7 | 100 |
| 5-4 | ZTC | No. 2 | 4.0 | No. 4 | 0 | 5-6 | 100 |
| 5-5 | None | No. 2 | 0 | No. 4 | 0 | 9 | 100 |
| 5-6 | ZnO | No. 2 | 2.31 | No. 4 | 0 | 3 | 100 |

The results in Table 8 demonstrate that addition of a topcoat initiator to the undercoat provided substantial reductions in topcoat tack-free time (compare Run No. 5-1 to Run No. 5-2, Run No. 5-3 to Run No. 5-4, Run No. 5-5 to Run No. 5-6 and Run No. 5-7 to Run No. 5-8) without adversely affecting strippability.

EXAMPLE 6

PEKONIL™ PZC potassium zirconium carbonate (commercially available as an approximately 20 wt. % zirconium oxide solution from Clariant and identified below as "KZrC") was added in varying amounts to Undercoat No. 1, coated in two layers on cleaned tiles with air drying between layers, then overcoated with Topcoat No. 3. The topcoat tack-free times and 20° gloss values are shown below in Table 9, along with results for a similar multilayer finish made by adding 2% (based on the equivalent weight of zinc oxide) of zinc tetraamine carbonate to Undercoat No. 1.

TABLE 9

| Run No. | Initiator | Initiator Conc. In Undercoat, %* | Tack-free time (hours:min) | 20° Gloss |
|---|---|---|---|---|
| 6-1 | None | 0.0 | 8:20 | 81 |
| 6-2 | KZrC | 0.7 | 8:20 | 81 |
| 6-3 | KZrC | 1.3 | 6:40 | 81 |
| 6-4 | KZrC | 2.0 | 5:20 | 84 |
| 6-5 | KZrC | 2.7 | 5:10 | 79 |
| 6-6 | KZrC | 3.3 | 5:10 | 82 |
| 6-7 | KZrC | 4.0 | 4:10 | 81 |
| 6-8 | ZTC | 2.0 | 4:40 | 81 |

*= Based on the weight of metal oxide equivalent to the total undercoat weight.

The results in Table 9 demonstrate that addition of sufficient potassium zirconium carbonate to the undercoat could substantially decrease the topcoat tack-free time (e.g., by as much as 50% in these runs, compare Run Nos. 6-1 and 6-7), while unexpectedly maintaining good gloss performance. The tack-free time reduction was comparable to that obtained using zinc tetraamine carbonate.

Various modifications and alterations of this invention will be apparent to those skilled in the art without departing from the scope and spirit of this invention. It should be understood that this invention is not limited to the illustrative embodiments set forth above.

We claim:

1. A method for applying a jobsite-renewable finish to a floor comprising applying to the floor a multilayer coating system comprising an undercoat employing a first hardening system and an autohardenable topcoat employing a second hardening system, air-drying the undercoat to harden it on the floor, and air-drying the topcoat to harden it on the undercoat, wherein at least the undercoat comprises at least one initiator for the topcoat hardening system in an amount sufficient to decrease the topcoat tack-free time when air-dried.

2. A method according to claim 1 wherein the undercoat comprises a film-former.

3. A method according to claim 1 wherein the undercoat comprises a water-soluble or water-dispersible polymer.

4. A method according to claim 1 wherein the undercoat comprises a water-based emulsion.

5. A method according to claim 1 wherein the undercoat comprises an acid-containing polymer.

6. A method according to claim 5 wherein the polymer is crosslinked using a transition metal, alkaline earth metal, alkali metal or mixture thereof.

7. A method according to claim 1 wherein the undercoat comprises a plurality of layers at least one of which contains materials different from those in the other layers.

8. A method according to claim 7 wherein at least one undercoat layer is not homogeneous.

9. A method according to claim 7 wherein only the uppermost undercoat layer comprises initiator.

10. A method according to claim 1 wherein the topcoat comprises a polymerizable polyurethane, polymerizable polyurea or combination thereof.

11. A method according to claim 1 wherein the topcoat comprises a two-component polymerizable polyurethane comprising (a) a polyester polyol, polyether polyol, acrylic polyol, polyurethane polyol or combination thereof and (b) a polyisocyanate.

12. A method according to claim 11 wherein the undercoat comprises a water-soluble or water-dispersible acid-containing polymer and the topcoat comprises a two-component aqueous polyurethane.

13. A method according to claim 1 comprising a plurality of initiators.

14. A method according to claim 1 further comprising at least one initiator in the topcoat.

15. A method according to claim 1 wherein the initiator comprises a zinc compound, tin compound, zirconium compound or amine.

16. A method according to claim 1 wherein the initiator comprises zinc oxide, zinc tetraamine carbonate, zinc ammonium carbonate, zinc polyacrylate or potassium zirconium carbonate.

17. A method according to claim 1 wherein the initiator comprises dibutyltin bis(1-thioglycerol).

18. A method according to claim 1 wherein the undercoat contains sufficient initiator to decrease the topcoat tack-free time by at least about 10%.

19. A method according to claim 1 wherein the undercoat contains sufficient initiator to decrease the topcoat tack-flee time by at least about 30%.

20. A method according to claim 1 wherein the undercoat contains sufficient initiator to decrease the topcoat tack-free time by at least about 50%.

21. A method according to claim 1 wherein the undercoat contains about 1 to about 50 wt. % initiator.

22. A method according to claim 1 wherein the undercoat contains about 2 to about 30 wt. % initiator.

23. A method according to claim 1 wherein the undercoat contains about 2 to about 20 wt. % initiator.

24. A method according to claim 1 further comprising walking on the topcoat after it has become tack-free to apply a further topcoat layer.

25. A method according to claim 1 wherein the hardened topcoat and undercoat can be removed from the floor by applying a stripper composition containing at least one polar solvent, allowing the stripper composition to contact the topcoat for sufficient time to soften the topcoat and undercoat, and removing the softened topcoat and undercoat from the floor by mopping, vacuuming, mild abrasion or other measures that do not remove substantial portions of the floor.

26. A method according to claim 1 wherein the floor comprises wood, vinyl or vinyl composite.

27. A method according to claim 1 further comprising applying one or more leveling coatings to the floor before applying the undercoat.

28. A coated floor comprising a flooring substrate and a jobsite-renewable finish comprising a hardened undercoat employing a first hardening system atop the flooring substrate and an unhardened autohardenable topcoat employing a second hardening system atop the undercoat, wherein the topcoat begins hardening upon being mixed or dispensed and without requiring an external energy source such as UV or visible light illumination or elevated heating to harden to at least a tack-free state when in a thin film form, and at least the undercoat comprises at least one initiator for the topcoat hardening system in an amount sufficient to decrease the topcoat tack-free time when air-dried.

29. A coated floor according to claim 28 wherein the undercoat comprises the hardened product of a water-soluble or water-dispersible acid-containing polymer crosslinked using a transition metal, alkaline earth metal, alkali metal or mixture thereof.

30. A coated floor according to claim 28 wherein the topcoat comprises a polymerizable polyurethane, polymerizable polyurea or combination thereof.

31. A coated floor according to claim 28 wherein the undercoat comprises the hardened product of a water-soluble or water-dispersible acid-containing polymer crosslinked using a transition metal, alkaline earth metal, alkali metal or mixture thereof and the topcoat comprises an autohardenable mixture of a two-component polymerizable polyurethane.

32. A coated floor according to claim 31 wherein the polymerizable polyurethane comprises (a) a polyester polyol, polyether polyol, acrylic polyol, polyurethane polyol or combination thereof and (b) a polyisocyanate.

33. A coated floor according to claim 28 wherein the initiator in the unhardened undercoat comprises a zinc compound, tin compound, zirconium compound or amine.

34. A coated floor according to claim 28 wherein the initiator in the unhardened undercoat comprises dibutyltin bis (1-thioglycerol).

35. A coated floor according to claim 28 wherein the unhardened undercoat contained sufficient initiator to decrease the topcoat tack-free time by at least about 10%.

36. A coated floor according to claim 28 wherein the unhardened undercoat contained sufficient initiator to decrease the topcoat tack-free time by at least about 30%.

37. A coated floor according to claim 28 wherein the unhardened undercoat contained sufficient initiator to decrease the topcoat tack-free time by at least about 50%.

38. A coated floor according to claim 28 wherein the unhardened undercoat contained about 1 to about 50 wt. % initiator.

39. A coated floor according to claim 28 wherein the unhardened undercoat contained about 2 to about 30 wt. % initiator.

40. A coated floor according to claim 28 wherein the unhardened undercoat contained about 2 to about 20 wt. % initiator.

41. A coated floor according to claim 28 wherein the hardened topcoat and undercoat can be removed from the flooring substrate by applying a stripper composition containing at least one polar solvent, allowing the stripper composition to contact the topcoat for sufficient time to soften the topcoat and undercoat, and removing the softened topcoat and undercoat from the floor by mopping, vacuuming, mild abrasion or other measures that do not remove substantial portions of the flooring substrate.

42. A coated floor according to claim 28 wherein the flooring substrate comprises wood, vinyl or vinyl composite.

43. A coated floor according to claim 28 wherein the topcoat comprises a polymerizable polyurethane, polymerizable polyurea or combination thereof.

44. A coated floor according to claim 28 wherein the polymerizable polyurethane comprises (a) a polyester polyol, polyether polyol, acrylic polyol, polyurethane polyol or combination thereof and (b) a polyisocyanate.

45. A jobsite-renewable floor finish kit comprising an undercoat employing a first hardening system, an autohardenable topcoat employing a second hardening system and instructions for jobsite application of the unhardened undercoat to a floor and the unhardened topcoat to the undercoat, wherein the topcoat begins hardening upon being mixed or dispensed and without requiring an external energy source such as UV or visible light illumination or elevated heating to harden to at least a tack-free state when in a thin film form, and at least the undercoat comprises at least one initiator for the topcoat hardening system in an amount sufficient to decrease the topcoat tack-free time when air-dried.

46. A finish kit according to claim 45 further comprising a waterborne maintenance coat composition.

47. A finish kit according to claim 45 further comprising a stripper.

48. A finish kit according to claim 45 wherein the topcoat comprises a polymerizable polyurethane, polymerizable polyurea or combination thereof.

49. A finish kit according to claim 45 wherein the initiator comprises a zinc compound, tin compound, zirconium compound or amine.

50. A finish kit according to claim 45 wherein the initiator comprises zinc oxide, zinc tetraamine carbonate, zinc ammonium carbonate, zinc polyacrylate or potassium zirconium carbonate.

51. A finish kit according to claim 45 wherein the undercoat contains about 2 to about 30 wt. % initiator.

52. A coated floor according to claim 28 comprising one or more leveling coatings between the floor and undercoat.

53. A finish kit according to claim 45 further comprising a leveling coating.

* * * * *

UNITED STATES PATENT AND TRADEMARK OFFICE
CERTIFICATE OF CORRECTION

PATENT NO. : 7,527,861 B2
APPLICATION NO. : 10/756119
DATED : May 5, 2009
INVENTOR(S) : Minyu Li et al.

It is certified that error appears in the above-identified patent and that said Letters Patent is hereby corrected as shown below:

On the title page item (73),
"Ecolab, Inc." should read -- Ecolab Inc. --.

Column 20, Line 22, Claim 19:
"tack-flee" should read -- tack-free --.

Column 2, Line 62:
"as coating" should read -- as a coating --.

Column 5, Line 42:
"arbonates" should read -- carbonates --.

Signed and Sealed this

Twenty-ninth Day of December, 2009

David J. Kappos
*Director of the United States Patent and Trademark Office*